United States Patent
Johnston et al.

[15] 3,667,601
[45] June 6, 1972

[54] APPARATUS FOR THE DRY SEPARATION OF GRANULAR MATERIALS

[72] Inventors: Norris Johnston; Mark Latker, both of Ojai, Calif.

[73] Assignees: Albert M. Clark; John C. Manning, Bakersfield; John G. Troster, Atherton, all of Calif.; part interest to each

[22] Filed: Oct. 6, 1969

[21] Appl. No.: 863,989

[52] U.S. Cl. ..........................209/466, 209/486, 209/495
[51] Int. Cl. ..........................................B07b 3/00
[58] Field of Search................209/466, 423, 425, 490, 486, 209/506, 491, 492, 495, 424, 426, 427, 441–443, 467–469, 480, 481

[56] References Cited

UNITED STATES PATENTS

| 3,108,950 | 10/1963 | Buckley | 209/466 |
| 550,219 | 11/1895 | Down | 209/466 |
| 448,961 | 3/1891 | Husemann | 209/486 X |
| 879,069 | 2/1908 | Tolmie | 209/466 |
| 1,945,526 | 2/1934 | Gibson | 209/466 X |
| 2,075,747 | 3/1937 | Nolte | 209/466 X |
| 2,396,954 | 3/1946 | Kranz et al. | 209/260 |

*Primary Examiner*—Frank W. Lutter
*Assistant Examiner*—Ralph J. Hill
*Attorney*—Bernard Kriegel

[57] ABSTRACT

Granular material dry separator apparatus embodying a resiliently mounted porous deck vibrated longitudinally, the deck having parallel transverse upper grooves at right angles to its longitudinal direction of vibration. Granular material is dropped onto the deck at one end, low pressure air being forced upwardly through the deck while it is being vibrated to cause granules or particles of greater specific gravity to drop to the bottom of the grooves while the lighter particles are caused to float upwardly and flow progressively from groove to groove toward the opposite end of the porous bed or deck. At predetermined intervals, a mechanism tilts the porous deck to discharge the granular contents in the grooves into collection troughs.

6 Claims, 4 Drawing Figures

INVENTORS.
NORRIS JOHNSTON
MARK LATKER
BY Bernard Kriegel
ATTORNEY.

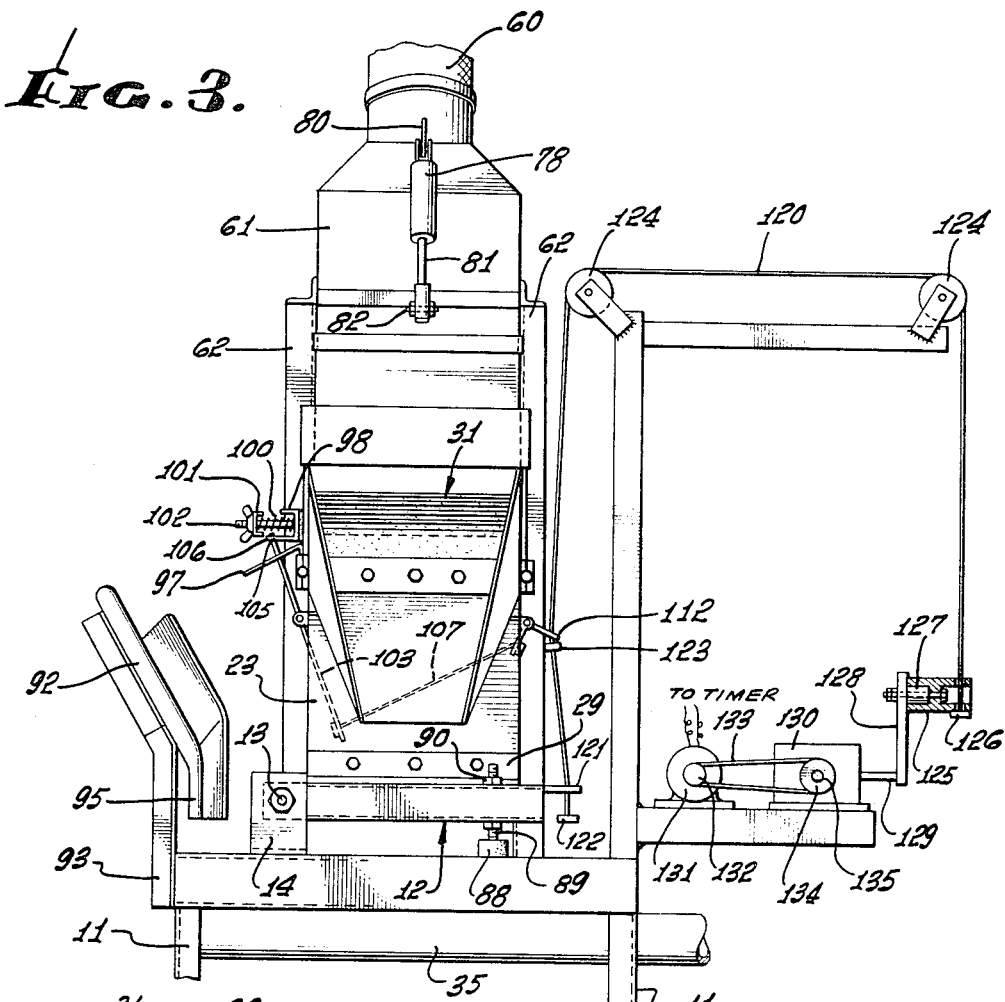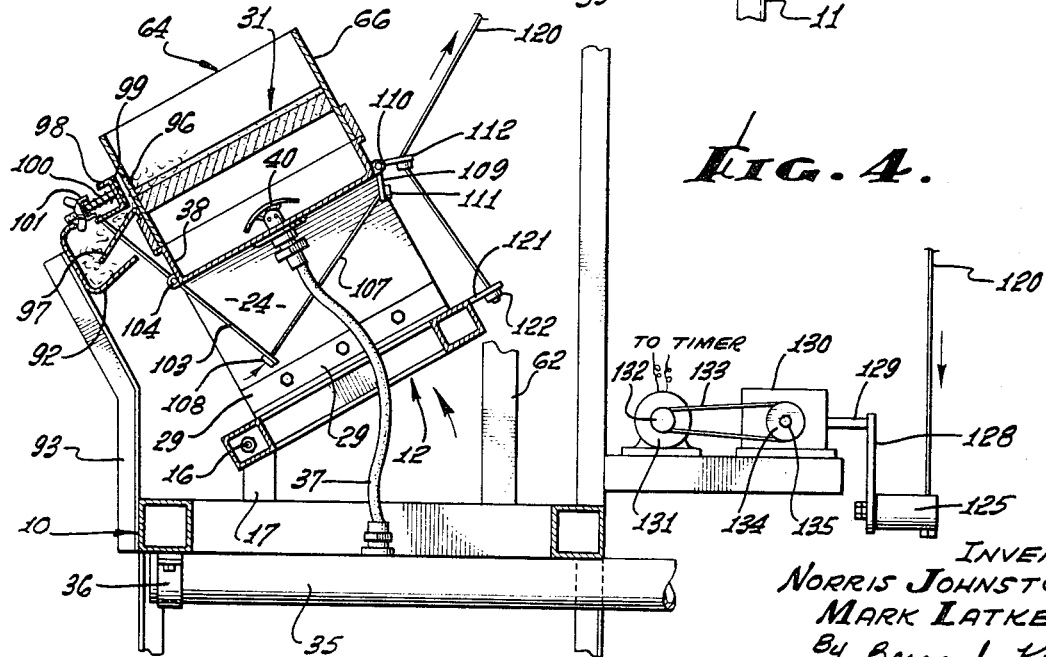

APPARATUS FOR THE DRY SEPARATION OF GRANULAR MATERIALS

The present invention relates to separator apparatus, and more particularly to apparatus for separating dry granular materials.

Apparatus for separating dry granular material has been proposed in which a porous bed or deck provided with grooves in its upper surface is vibrated while air is forced upwardly through the deck to convey granular material deposited on the deck at one end along the deck toward its other end, granules of higher specific gravity settling out of the mix into the bottoms of the grooves as the mix proceeds along the deck, remaining in the grooves from which they are later collected. An example of such separator apparatus is disclosed in U.S. Pat. No. 3,108,950. However, such apparatus does not perform effectively. Difficulty is encountered in effecting separation between particles of different specific gravities, since the material tends to vibrate toward the sides of the grooved deck. Adjustment of the frequency of vibration of the deck in relation to the air flowing through the porous deck is delicate and militates against efficient operation since variations occur in the ore, or other granular material, fed onto the grooved deck. Removal of the granules that have settled into the grooves has involved relatively complex external devices, and the extent of recovery of the heavier particles has been comparatively low.

With apparatus embodying the present invention, the foregoing difficulties and disadvantages of the prior apparatus have been overcome. Transverse grooves in the porous deck are disposed at 90° to the direction of flow of the ore, or other material, and the direction of vibration of the deck to cause the particles to rotate or orbit in the grooves, with the heavier particles orbiting in relatively flat elliptical paths, while the lighter or gangue particles orbit in higher elliptical paths, enabling them to jump into succeeding grooves as the deck vibrates, the heavier particles remaining in the grooves. The particles do not travel in random motion, or transversely of the deck, but lengthwise therealong. The recovery of heavier particles is comparatively high, the apparatus operating efficiently for any single adjustment of vibration rate of the deck, air pressure, and feed of material onto the deck, despite variations in the contents of the material. The recovery of the particles from the grooves is effected by a simple mechanism, which can dump the entire deck at prescribed intervals, resulting in high recovery. The longitudinal vibration of the deck is preferably effected at relatively high frequency and small amplitude, for example, at 8,000 vibrations per minute and 0.005 inch amplitude, which causes appropriate flow of the material over the grooved, downwardly inclined permeable deck or bed, while air is forced upwardly through the deck to float the lighter material upwardly and toward the final discharge end of the deck.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 3 is an end view taken along the line 3—3 on FIG. 1;

FIG. 4 is a transverse cross-section through the apparatus disclosing the tilting of the porous bed and supporting structure to remove the contents from the bed or deck grooves.

Figure 1:
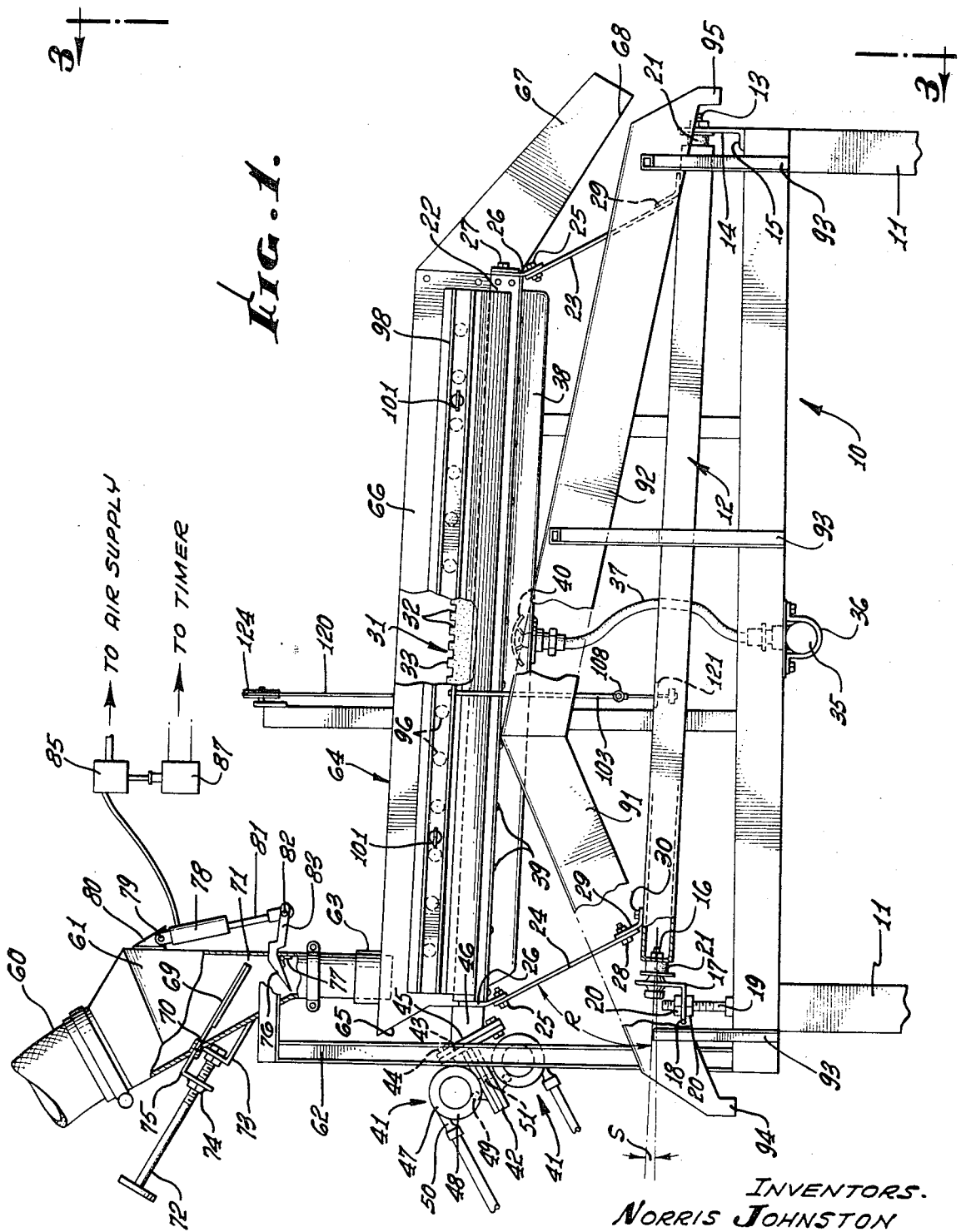
FIG. 1 is a side elevational view of apparatus embodying the invention, with parts broken away.

The apparatus illustrated in the drawings includes a frame structure 10 having supporting legs 11 adapted to rest upon the ground, or other suitable surface. This frame carries a lower sub-frame 12, which can occupy a vertical or upright position, and which may be tilted. The sub-frame is pivotally mounted on the main frame by a forward hinge pin 13 secured to one side of the sub-frame and passing through an upper arm 14 of a bracket 15 suitably secured to the main frame. The other end of the sub-frame has its side portion attached to a pivot 16 which extends into a rear bracket 17 of angle iron form, the generally horizontal portion 18 of this bracket fitting over an upwardly extending stud 19 secured to the main frame 10 and which has nuts 20 threaded thereon and engaging opposite sides of the horizontal flange 18, for the purpose of adjusting the rear end of the lower sub-frame. The forward and rear pivot pins or bolts 13, 16 are aligned with one another. The sub-frame 12 is preferably tilted to the horizontal by adjusting the nuts 20 on the stud by a small angle indicated as the angle S in FIG. 1. Rubber or rubber-like shock absorbers or vibration isolators 21 are mounted on each pivot bolt between the forward and rearward ends of the sub-frame and the forward and rearward brackets 15, 17, to minimize the transmission of vibrations from the sub-frame 12 to the main frame 10.

The lower sub-frame supports a box-like chassis structure 22 through the agency of forward and rearward leaf spring plates 23, 24, which are relatively rigid and which are inclined at a substantial angle R to the plane of the sub-frame. These plates 23, 24 extend substantially the full width of the chassis, their upper ends being secured by bolts 25, or the like, to the lower portions of plates 26 which are, in turn, secured, as by bolts 27, or the like, to the forward and rearward ends of the chassis. The lower ends of the leaf spring plates 23, 24 are secured by bolts 28, or the like, to the upwardly extending flanges of angle irons 29, the lower flanges of which are secured by bolts 30, or the like, to the lower sub-frame 12. The chassis 22 is parallel to the lower sub-frame, and is also preferably inclined at the relatively small angle S to the horizontal.

A permeable bed or deck 31 is rigidly adhered, as by cementing, to the chassis 12, extending from its rear to its front end. This bed may be comprised of sintered silica, or of quartz with a glass frit binder. One form of material of which the bed or deck is composed is marketed by Ferro Corporation of Cleveland, Ohio under the trademark Filtros. This deck 31 is also inclined to the horizontal by substantially the same angle of inclination to the horizontal as the sub-frame, such angle of inclination S being variable, through adjustment of the rear angle iron bracket 17 on the stud 19 from 0° to about 10°.

The deck, bed, or table 31 has a plurality of spaced transverse grooves 32 in its upper surface which are disposed perpendicular to the direction in which the bed is vibrated longitudinally, as described hereinbelow. These grooves are parallel to each other and are open at their ends. Their width and depth may be varied, and their separation from one another may also be varied. By way of example, the width of each groove may be one-fourth inch and the depth may also be one-fourth inch, with the lands 33 between adjacent grooves having a width of about one-fourth inch.

Air is forced upwardly through the permeable deck 31 from below in effecting separation between components of materials placed upon the deck. Air at the appropriate pressure and from a suitable source is fed into an air supply manifold 35 supported on the main frame 10 by brackets 36. A flexible air hose 37 extends from this manifold and is connected to a pan or air header 38 disposed below and covering the entire open area of the chassis 22, being secured thereto by screws 39, or the like, passing through the air header flange at its outer portion, the air header being mounted on the chassis in leak-proof relation with respect thereto. The air discharges from the air hose inside the pan and strikes against an air diffuser or deflector 40, which prevents direct upward impingement of the air stream against the lower end of the deck immediately above the outlet of the air hose. The air in the pan then passes throughout the interior of the chassis and upwardly through the porous bed 31 for action upon the material thereon as the bed is being vibrated.

Linear vibrations are imparted to the chassis 22 and the deck or bed 31 thereon, which is rigidly secured thereto, by linear vibrators 41 of any suitable type which is rigidly secured to the rear end of the chassis. The vibrators may be of the type obtainable from Martin Engineering, Neponset, Illinois, known as Vibrolators. The linear vibrators are suitably secured to a common mounting plate 42 in opposed relation, this mounting plate having a flange 43 secured by bolts or studs 44 to a flange 45 of a member 46 rigidly fixed to the chassis 22. Each vibrator 41 includes a casing 47 providing a toroidal passage 48 around which a ball 49 is driven by air passing into an air inlet 50 tangent to the passage, the ball being driven by the air around the passage, with the air exhausting from the passage through a suitable exhaust port 51 displaced about 180° from the air inlet. The linear vibrators 41 are oppositely arranged and rotate the balls in opposite directions to provide an unbalanced condition which effects vibration of the vibrators, of the chassis 22 secured thereto, and of the deck or bed 31. The vibrators are mounted with respect to the chassis so as to impose linear vibrations in a direction normal to the planes of the flat leaf springs 23, 24. Such direction of linear vibration is preferably 90° to the planes of the leaf springs, and the leaf springs are disposed about 60° (angle R) to the pivot axis of the sub-frame 12.

While the deck 31 is being vibrated by the vibrators 41 in a longitudinal direction, as permitted by the leaf springs 23, 24, the dry material to be separated is dropped onto the rear end of the deck. The material is fed through a suitable feed tube or duct 60 into a hopper 61 supported by the lower frame 10 through vertical standards 62, the material dropping from the mouth 63 of the discharge end of the hopper onto the bed 31. The material is confined by an enclosure 64 suitably fixed to the chassis 22 and extending upwardly a substantial distance above the bed. As disclosed, it includes a rear end wall 65 and confining side walls 66, the forward end of the side walls being connected to a downwardly extending dump trough 67, the bottom 68 of which extends downwardly from the bottom of the chassis.

The flow of material onto the bed 31 is controlled by a gate 69 extending across the hopper, this gate being inclined in a downward and forward direction and being slidable through a slot 70 in the hopper. The opening or gap 71 between the forward end of the gate and the opposed forward wall of the hopper is controlled by a handle 72 rotatably mounted in a bracket 73 suitably secured to the rear portion of the hopper and threaded within a nut 74 attached to a flange 75 integral with or secured to the gate 69. Thus, rotation of the control handle 72 in one direction or the other will effect corresponding sliding of the gate 69 within the hopper 61 to determine the size of the opening or gap 71 between the end of the gate and the wall of the hopper, and thereby the rate of downward feed or dropping of the granular material onto the rear portion of the permeable deck 31.

As described hereinbelow, at intervals the flow of material from the hopper 61 onto the deck is to be stopped or prevented. This action is effected by a check gate 76 in the hopper disposed below the flow gate 69. This check gate has a hinge connection 77 with the hopper and normally extends downwardly along the forward wall of the hopper to permit the material to pass from the hopper downwardly onto the deck or bed. When the discharge end of the hopper is to be closed by the check gate 76, air is fed into the head end of a cylinder 78 that has a pivotal connection 79 with a bracket 80 secured to the hopper, the air driving a piston and piston rod 81 downwardly of the cylinder which has a pivotal connection 82 with an arm 83 affixed to the check gate 76 and extending outwardly of the hopper. Normally, in the absence of air under pressure fed into the head end of the cylinder 78, the weight of the check gate 76 swings it downwardly into an ineffective position to force the piston rod and piston device 81 upwardly in the cylinder 78. However, when air from the suitable air supply under the control of a valve 85 is allowed to pass into the cylinder through a suitable tube or hose 86, the gate is swung upwardly in the hopper to a position closing the discharge end of the hopper. The valve controlling the air supply is operated by a solenoid 87, which is electrically connected to a suitable timer switch (not shown). When the solenoid is energized, it will shift the valve 85 to permit air to flow to the cylinder 78, and when deenergized it will position the valve 85 to shut off the air supply and open the line 86 leading to the cylinder to atmosphere, permitting exhaust of air from the cylinder.

Figure 2:
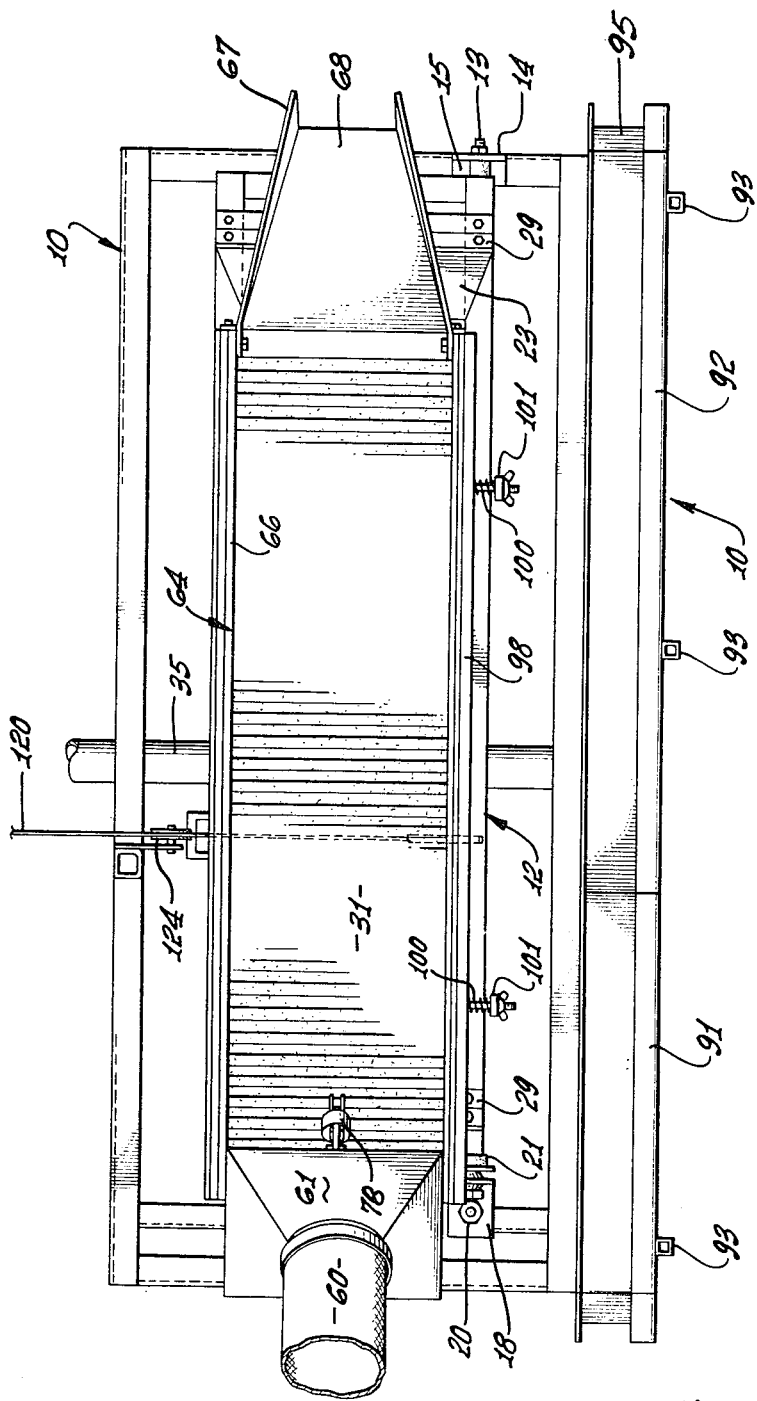
FIG. 2 is a top plan view of the apparatus disclosed in FIG. 1.

The lower sub-frame 12, and all parts supported thereby, normally occupy the positions illustrated in FIGS. 1, 2 and 3, the parts being supported in such position by the sub-frame pivot 13, 16 and by rubber or other elastomer shock absorber members 88 fixed to the lower ends of the studs 89 passing upwardly through the sub-frame and secured thereto by nuts 90 threaded on the studs and tightened against upper and lower surfaces of the sub-frame 12. When the contents of the grooves 32 in the deck are to be removed therefrom, the entire sub-frame and the members mounted thereon are tilted, so that the material will flow from the ends of the grooves at one side of the deck into collection troughs 91, 92. Thus, the heavier materials will separate into the grooves 32 in the rear portion of the deck 31, and the middlings will be disposed in the remainder of the deck, while the tailings will pass into the dump trough 67 at the forward end of the deck.

The troughs 91, 92 are mounted upon suitable upright supports 93 extending upwardly from the main frame 10. The concentrate trough 91 is inclined in a downward and rearward direction so that the material therein will flow downwardly and from the lower discharge end 94 of the trough into a suitable bin (not shown), or the like. The trough 92 for the middlings extends from the concentrate trough downwardly in a forward direction, and the material therein will flow to the discharge end 95 and will drop into a middling bin (not shown), or the like. The middlings and concentrate troughs are located to one side of the sub-frame 12 and in a position such that tilting of the sub-frame and the chassis 22 and deck 31 carried thereby will cause the particles in the grooves to pass through a longitudinal extending side opening 96 in the chassis at one side thereof and onto a guide plate 97, which will then extend above the troughs 91, 92 so as to be assured that the material from the groove will empty into particular troughs.

Normally, the discharge opening 96 in the chassis, which is disposed across the ends of the grooves 32, will be closed by a longitudinally extending gate 98 that has a soft gasket 99 secured thereto for bearing against the exterior side of the chassis. This gate is urged toward a closed position by a plurality of springs 100 bearing thereagainst and also against spring seats 101 threaded on studs 102 passing through the gate and suitably secured to the side wall of the chassis. When the sub-frame 12, chassis 22, and gate 98 are tilted, so as to dump the contents of the grooves 32 into the troughs 91, 92, the gate is open to permit such dumping action to occur.

As disclosed in the drawings, a mechanism for effecting the dumping action includes a device for tilting the sub-frame, chassis and deck, and for also opening the gate. A lever 103 of the first class is mounted on a pivot 104 secured to the chassis 22, the upper end of the lever extending freely through an opening 105 in the lower flange 106 of the channel-shaped door or gate 98. A cable 107 extends through the lower arm of the lever 103, there being a clamp 108 suitably attached to the cable and adapted to move the lever in a counterclockwise direction (as seen in FIG. 4) when the cable 107 is tensioned. The other end of the cable passes through a bell crank lever 109 mounted on a pivot 110 suitably secured to the other side of the chassis, there being a clamp 111 attached to the cable 107 and which is engageable by a lower arm of the bell crank lever. When the upper arm 112 of the bell crank lever is shifted upwardly, the cable is tensioned to actuate the gate or door lever 103 to open the door 98 against the force of the closing springs 100.

The tilting of the sub-frame 12 and the mechanism carried by it is accomplished by a cable 120 extending slidably through an arm 121 fixed to the sub-frame and projecting laterally from its side opposite the location of the sub-frame pivotal mountings 13, 16. This cable has a clamp 122 secured thereto and disposed below this arm. The cable has another clamp 123 secured thereto below the upper bell crank lever arm 112, which is engageable therewith, the cable extending over pulleys 124 and then passing through a crank pin roller 125 to which it is attached by a cable clamp 126. This roller is rotatably mounted on a pin 127 affixed to the arm 128 of a crankshaft 129 extending from a speed reducer box 130. An electric motor 131 has a driving pulley 132 mounted on its shaft, its motion being transmitted to the gear box 130 by a belt 133 engaging the driving pulley 132 and also a driven pulley 134 fixed to a shaft 135 extending from the gear box. The electric motor 131 is energized under the control of a suitable electric timer (not shown) to rotate the crankshaft 129 and apply tension to the cable 120, so that the cable clamp 123 first engages the upper bell crank lever arm 112 to swing it in the counterclockwise direction, as seen in FIG. 4, to tension the cable 107 and effect swinging of the gate opening lever 103 to shift the gate 98 to an open position. The continued movement of the cable 120 by the rotation of the crank 129 then engages the lower cable clamp 122 with the sub-frame arm 121 to tilt the entire mechanism from the position disclosed in FIG. 3 to the position disclosed in FIG. 4, in which the contents of the bed grooves 32 are dumped through the open outlet 96 into the concentrate and middling troughs 91, 92. The continued rotation of the crankshaft then permits the weight of the sub-frame 12 and the mechanism supported thereby to reshift the latter downwardly and back to the position illustrated in FIG. 3, in which the rubber shock mounts 88 again engages the main frame 10 and the cable clamp 123 moves away from the bell crank lever arm 112 to permit the springs 100 to close the gate 98 over the opening 96 in the side of the chassis. When the parts return to this position, the electric motor 131 is automatically shut off by the timer.

The particles or grains of different specific gravity in a granular mix are separated by density difference, the operation involving an application of a modified form of the Stokes Law of Fall involving grain interference. A loose or disaggregated bed of granular material discharges from the hopper 61 onto the bed 31 and is subjected to a vertical air current of relatively low pressure flowing into the air header 38, plus a high frequency, low amplitude vibration to maintain disaggregation while the heavy grains fall to the bottoms of the bed grooves 32, the lighter ones being floated relatively upwardly by the air current and proceeding toward the forward end of the bed. For grains of the same weight, the denser ones will have a smaller size and thus will be impinged upon from below by fewer other particles than the light particles which have a larger size, and will thus be more likely to be floated away by the air current. For particles of the same size, the heavier ones will settle faster.

The deck 31 is inclined downwardly in the direction of flow, a longitudinal vibration being applied thereto by the vibrators 41 in a direction which, in the example given above, makes an angle of about 30° from the plane of the table, but which angle can vary between 0° and 40°. In order to assist the air flow in keeping the granular material loose and disaggregated, a useful range of vibrations imparted to the bed is over 2,000 per minute, with amplitudes ranging from 0.001 inch to 0.010 inch. Specifically, good results have been achieved with vibrations of 8,000 per minute and an amplitude of 0.005 inch. The grooves 32 in the table are perpendicular to the direction of flow of the granular material to be separated, these grooves, in the specific example given above, being approximately square in cross-section, with their front and back sides being generally perpendicular to the plane of the deck or bed. The heavier grains collect in the grooves 32, selectively displacing the lighter grains and gangue under the action of vibration and vertical air flow. The permeability of the bed is preferably between about 5 to 10 darcys, although satisfactory results can be achieved within a range of permeability of the bed from about 2 to 50 darcys.

The air flow rate, and also the frequency and amplitude of vibration of the deck, can vary for optimum separation of granular materials, depending upon the grain size and shape, and also because of the specific gravity differences and ranges of such differences. Higher rates of air flow are needed for coarser or heavier granular materials.

The apparatus and the method of use of such apparatus is capable of effecting separation of materials of grain size from about one-fourth inch down to less than 200 mesh. The heavier materials are collected in the first grooves 32 in the deck 31, the lower grade concentrate collecting in the succeeding grooves. When the desired concentrate has been collected in the rear grooves, the check gate 76 can be closed, and after a desired time has elapsed, the bed tilted to dump its contents into the concentrate and middlings troughs 91, 92.

A sequence of operation of the apparatus may include allowing the dry or other material to be separated to enter the hopper 61 and flow at a controlled rate onto the deck 31 for a predetermined length of time, which is programmed into the electric timer-switch (not shown). As an example, the material may be permitted to flow onto the deck for about 5 minutes. After such period has elapsed, the timer closes the circuit to the solenoid 87 which actuates the valve 85 and permits air to flow to the air cylinder 78, which shifts the piston 81 therein downwardly in order to swing the check gate 76 upwardly across the hopper to a closed position. During all this time, air flows upwardly through the porous deck 31 while it is being vibrated to effect the separation between the components of the ore or other material. After an additional period of time has elapsed, which, for example, may be 20 seconds, during which no more material is flowing out of the hopper 61 onto the deck 31, the vibration of the deck with air forced upwardly therethrough causes separation of the material on the deck and the movement of all tailings to the dump trough 67. The timer then closes the switch to the dump motor 131, which begins rotating to operate through the cables 120, 107 to open the side door 98 and tilt the apparatus to the position disclosed in FIG. 4, the concentrate and middlings dumping through the opening 96 in the side wall. The continued rotation of the motor then acts through the crank 128, 127 to return the apparatus to its initial position disclosed in FIG. 3, with the door 98 closed. Such position is achieved after the dump motor has turned the crank through one full revolution, after which the timer-switch shuts off the electric motor 131 and deenergizes the solenoid 87, permitting the hopper check gate 76 to swing downwardly to the open position, the cycle of operation then repeating.

It is to be noted that the grooves 32 are perpendicular to the direction of longitudinal vibration of the deck, and that the side walls of each groove are preferably approximately perpendicular to the plane of the deck. This action results in the particles of material in the transverse grooves rotating or orbiting under the combined action of the air and deck vibration. The linear vibration of small amplitude and high frequency results in the particles being moved upwardly and forwardly along the upstream wall of each groove, and then forwardly and downwardly along the downstream wall, the particles travelling in elliptical paths. The heavier particles rotate or orbit in flat ellipses near the bottom of each groove and must remain trapped therein, while the lighter particles rotate in higher ellipses, with the still lighter gangue particles rotating in still higher ellipses. This enables lighter particles to jump over from one groove into the next groove, proceeding downwardly along the deck, with the heavier particles remaining trapped in the grooves 32, while the gangue particles eventually discharge into the tailings trough 67. In view of the perpendicular disposition of the grooves 32 relative to the direction of longitudinal vibration, the fluid movement of the particles is lengthwise of the deck, without any significant lateral shifting of the particles in the grooves and toward the sides of the deck.

The flat leaf springs 23, 24 interconnecting the chassis and deck structure 22, 31 to the sub-frame 12 constrain the deck 31 to a substantial linear motion perpendicular to the plane of the leaf springs, without permitting the deck to have any transverse or random motion. The downward longitudinal slope of the deck controls the rate of flow of the material under given conditions of fluidity.

The removal of the concentrate from the grooves 32 is effected in a very simple manner, merely by tilting the deck 31. It is unnecessary to use external devices, such as cutter bars, dividing plates, scoops, vacuum mechanisms, and the like, for effecting recovery of the separated material from the grooves.

We claim:

1. In apparatus for separating intermixed materials of different specific gravities: a porous deck on which the intermixed materials are to be deposited; means for forcing a gaseous medium upwardly through said deck; means for vibrating said deck longitudinally along a predetermined path; said deck having spaced parallel grooves in its upper surface extending at right angles to said vibrating path; the ends of said grooves being open at one side of said deck; means for closing said ends of said grooves; means for moving said closing means to open position; and means for laterally tilting said deck to discharge the materials in said grooves through said open ends.

2. In apparatus as defined in claim 1; the upstream side walls of said grooves being substantially perpendicular to the plane of said deck; said porous deck being of sintered silica having a permeability of about 5 to about 10 darcys.

3. In apparatus for separating intermixed materials of different specific gravities: a lower supporting structure; generally parallel leaf springs spaced from each other and secured at their lower portions to said structure and extending upwardly therefrom at a substantial angle to the vertical; an upper supporting structure carried by said leaf springs and secured to the upper portions of said leaf springs, said upper structure including a porous deck on which the intermixed materials are to be deposited; means secured to the lower portion of said upper structure for distributing a gaseous medium to the underside of said deck which can pass upwardly through said deck; means secured to said upper structure for vibrating said upper structure and its deck longitudinally along a predetermined path; said deck having spaced parallel grooves in its upper surface extending at right angles to said vibrating path; the ends of said grooves being open at one side of said deck; means for closing said ends of said grooves; means pivotally mounting said lower structure for lateral tilting; and means for moving said closing means to open position and for tilting said lower supporting structure to tilt said deck laterally and allow materials in said grooves to discharge therefrom through said open ends.

4. In apparatus as defined in claim 3; means for conducting materials to be separated onto said deck at one end portion thereof; and means for closing said conducting means prior to tilting said lower supporting structure.

5. In apparatus as defined in claim 3; means for conducting materials to be separated onto said deck at one end portion thereof; means for closing said conducting means prior to tilting said lower supporting structure; and control means for determining the operation of said means for closing said conducting means and said means for opening said other closing means and tilting said lower supporting structure.

6. In apparatus as defined in claim 3; and material receiving means at a side of said deck to receive material from said grooves upon lateral tilting of said deck.

* * * * *